H. S. FOLKER.
CONTROLLING MEANS FOR AUTOMATIC TRAIN STOPS.
APPLICATION FILED JAN. 26, 1916.

1,284,286.

Patented Nov. 12, 1918.
2 SHEETS—SHEET 2.

WITNESS

INVENTOR
Howard S. Folker
BY
Cornelius C. Billings
his ATTORNEY

UNITED STATES PATENT OFFICE.

HOWARD S. FOLKER, OF OROVILLE, CALIFORNIA, ASSIGNOR TO THE NATIONAL SAFETY APPLIANCE COMPANY, OF SAN FRANCISCO, CALIFORNIA, A CORPORATION OF CALIFORNIA.

CONTROLLING MEANS FOR AUTOMATIC TRAIN-STOPS.

1,284,286.  Specification of Letters Patent.  Patented Nov. 12, 1918.

Application filed January 26, 1916. Serial No. 74,325.

*To all whom it may concern:*

Be it known that I, HOWARD S. FOLKER, a citizen of the United States, and a resident of Oroville, county of Butte, and State of California, have invented certain new and useful Improvements in Controlling Means for Automatic Train-Stops, of which the following is a specification.

This invention relates to valves which are controlled in their operation by a difference in fluid pressure and they are designed particularly to be used in the operation of automatic train stopping mechanism.

The valve structure is so related to the other elements of the train stop mechanism that the venting of a portion of the fluid pressure in one of the chambers of the valve mechanism will cause a normally open valve to close, thereby preventing the release of the brakes.

One of the objects of the invention is to provide a valve so related to the other elements of the train stop mechanism as to prevent the release of the brakes after the train stop has operated to apply them. Another object is to provide a structure by means of which the release of the brakes is not only prevented, but will permit the engineer to apply the brakes more heavily and quickly. Other objects will appear from the hereinafter description.

To accomplish these objects the valve is so constructed and positioned in its relation to the other elements of the train stop mechanism that it is impossible to open the valve for the purpose of supplying pressure to the brake pipe until after the engine has come to a stop and the engineer has been required to dismount from his cab in order to operate the release mechanism, yet the construction is such that the valve may be opened after the brakes have been initially applied in order to take air from the brake pipe to thereby give a heavier and quicker application of the brakes.

Referring to the drawing.

Figure 1:
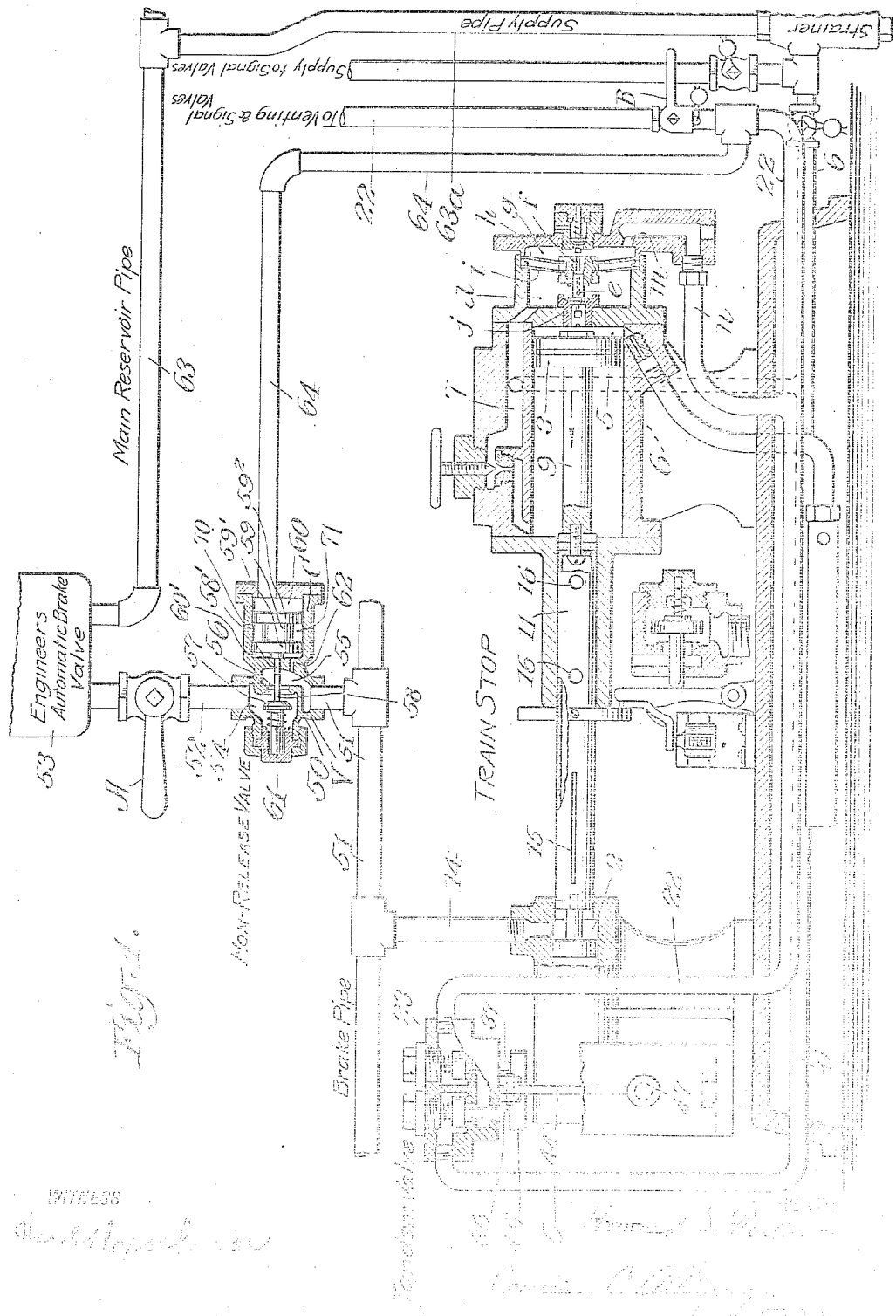
Figure 1 is a combined structural and diagrammatic view with certain portions of the structure shown in section and other portions shown in elevation, the non-release valve being shown in its open or normal position.
Figure 2:
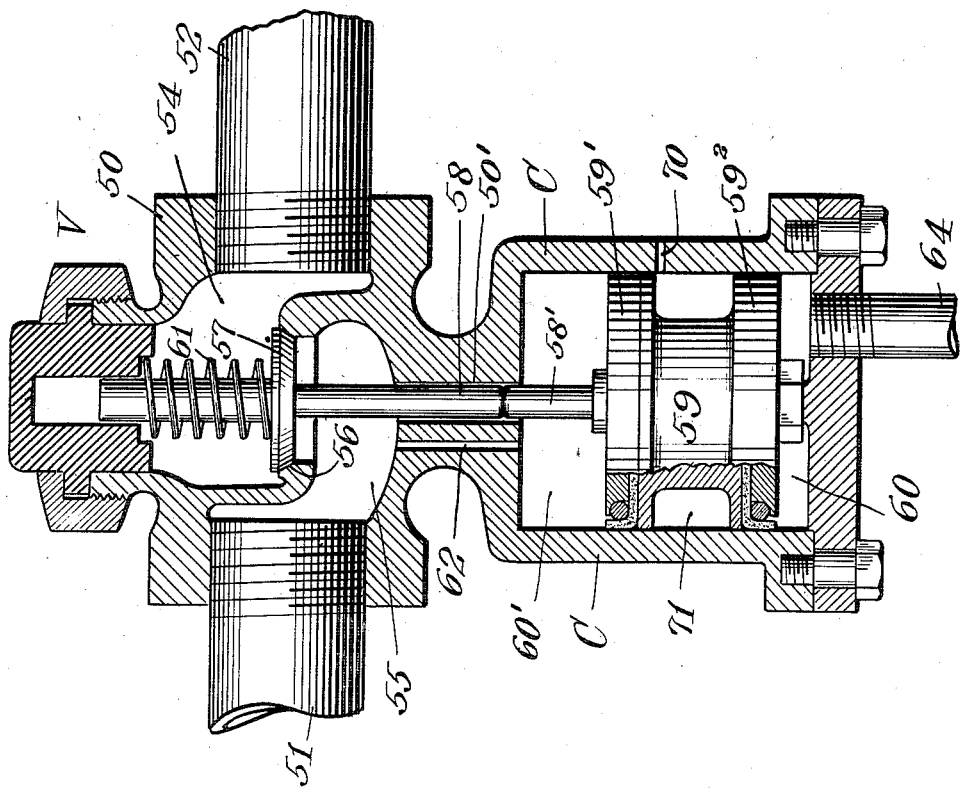
Fig. 2 is a section of the non-release valve, the said valve being shown in its closed position.

This particular invention is used in combination with the mechanisms disclosed in my co-pending applications Serial No. 43,592, filed August 4, 1915, and Serial No. 55,424 filed October 12, 1915. In this combination is included as an element, a valve V which I have chosen to designate the non-release valve. This valve is located between the brake pipe 51 and a supply pipe 52, which latter is connected to the usual engineer's automatic brake valve 53 of the flat rotary type having many ports (not shown in detail). The non-release valve V is provided with chambers 54 and 55 between which is located the valve seat 56, so situated as to coöperate with a valve 57, which valve is secured to a valve stem 58. A piston 59 operates in a cylinder C extending from the non-release valve casing 50. Projecting from the center of the piston 59 is a rod 58' which is adapted to co-act with the lower end of the valve rod 58, said rods 58 and 58' passing through an opening 50' extending through the connecting wall between the valve casing 50 and the cylinder C. The cylinder chamber 60 in the cylinder C is connected to a pipe 64 which joins with the pipe 22 leading to the venting valve (not shown). Normally, pressure in the chamber 60 operating against the right or outer side of the piston 59 keeps the valve 57 unseated. When the pressure in the chamber 60 is reduced by a mechanism to be hereinafter described, the piston 59 will be moved to the right by the action of the spring 61 and also by means of the pressure on the piston 59 from the chamber 55, through the small port 62 which communicates with the interior of the chamber 60' in the cylinder C.

From the foregoing it will be seen that when pressure is reduced in the chamber 60 below the pressure in the train pipe, the piston 59 will move, thereby permitting the valve 57 to seat itself, which action will prevent air from the engineer's valve 53 from being supplied to the brake pipe 51, and so while the valve 57 is in this closed position, the engineer will be unable to release the brakes. The fact that the valve 57 is seated, however, will not prevent it from being lifted from its seat when the engineer manipulates his automatic brake valve 53 so that it will open a port in said valve to atmosphere, thereby reducing the pressure in the chamber 54 which will permit the valve 57 to be unseated by the excess pressure in the brake pipe 51, and this will thereby cause a venting of the pressure in the brake pipe 51, which will result in a further and heavier application of the brakes.

The coöperation of the non-release valve V is closely related to the structure disclosed in my co-pending application above referred to, and the coöperation of these parts will now be briefly described. Normally, air is supplied to the diaphragm valve through pipes 63, 63ª and 6, supplying fluid pressure to the passage 7 communicating with the chamber $d$, which in turn communicates with the chamber $g$ by means of small ports $e$ and $f$. The chamber $g$ communicates by means of the port $m$ with the pipe $n$ which is a branch of pipe 22 leading to a tandem valve 23, which latter valve is described in my co-pending application Serial No. 55,424. The other end of the pipe 22 leads to the venting valve, not shown, of the engine equipment. The branch pipe 64 connects the pipe 22 with the chamber 60 in the cylinder C attached to the non-release valve V. Normally, main reservoir fluid pressure flows from the engineer's valve 53 through pipes 63, 63ª and 6 to the passage 7 and into the chamber $d$ through the ports $e$ and $f$, and thence into the chamber $g$. Pressure in the chamber $g$ acts against a diaphragm $h$ of greater area than the diaphragm $i$, tending to keep normally closed the valve $j$ connected thereto. When pressure in the pipe 22 is vented by means of the venting valve in the engine equipment, a reduction of pressure will take place in the chamber $g$ of the diaphragm valve and also in the chamber 60 attached to the non-release valve, which will operate to seat the valve 57, thereby cutting off communication between the engineer's automatic brake valve and the brake pipe 51. At the same time the unseating of the valve $j$ permits pressure to enter the cylinder 5, which will force forward the piston 3 in the direction of the arrow, which carries the piston rod 9 to which is attached a venting tube 11. When the venting tube 11 has moved a short distance, the slot 15 therein will move into the cylinder 2 which is connected to the brake pipe 51 by means of pipe 14 and will thereby vent the pressure in the brake pipe through the slot 15 and apertures 16 in the vent tube, thus giving a service application of the air brake.

In order to reset the train stop and the non-release valve, pressure must be supplied to the chamber $g$ of the diaphragm valve and the chamber 60 of the non-release valve cylinder C. It is only possible to supply this pressure by operating the tandem valve 23, and this valve is located on the train stop device in such position on the engine that it is necessary for the engineer to dismount from his cab in order to gain access to said valve.

The valve 23 is operated by pressing a button 47 secured to the end of a lever 44 which has an integral head 46 which coöperates with the valve stems 36 and 37 of the said tandem valve. This tandem valve 23 obtains its supply of air from the pipe 6 which is connected by the pipes 63 and 63ª to the engineer's automatic brake valve which receives its supply from the main reservoir as shown.

It will thus be seen that in order to release the brakes and reset the train stop device, the engineer must bring his train to a stop, dismount and operate the tandem valve.

Levers A and B are attached to valves in the pipes 52 and 22, respectively, and are utilized to operate the valves to which they are connected to close the same to put an engine equipment out of commission when two or more engines are connected to the same train. They are normally sealed open in the position shown.

An air passage 70 is provided in the wall of the cylinder C so located as to always lead to atmosphere from the chamber 71, formed between the piston heads 59' and 59² and the wall of the cylinder C to allow air leakage between the piston heads and cylinder wall to escape to the atmosphere.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense.

I desire it also to be understood that the language used in the following claims is intended to cover all of the generic and specific features of the invention herein described, and all statements of the scope of the invention which, as a matter of language, might be said to fall therebetween.

Having now described my invention, what I claim as new and desire to secure by Letters Patent is:

1. In an automatic train stop device for use with an air brake system having a brake pipe through which air may flow to and from suitable air operated brake mechanism; a normally open valve adapted to interrupt the flow of air through said brake pipe toward said brake mechanism; a cylinder; a piston movable within said cylinder and operatively associated with said valve to hold the same in its normally open condition; a passage through which air may flow from said brake pipe to the external atmosphere; a normally closed valve for controlling the flow of air through said passage; means operated by air under pressure for operating said second mentioned valve; a normally closed valve for controlling the supply of air to said valve operating means; means including a diaphragm, and a chamber subjected to varying air pressure, for operating said last mentioned valve; a conduit through which air under pressure may be supplied to said cylinder to thereby hold said first mentioned valve in its normally open condition, to said chamber to thereby hold said last mentioned valve in its normally closed condition, and to the operating means for said second mentioned valve; a normally closed manually operated valve for controlling the supply of air to said cylinder and to said chamber; and means for relieving the pressure of air in said cylinder and in said chamber to thereby secure the closing of said first mentioned valve and a flow of air from the brake pipe through the passage aforesaid and to the external atmosphere.

2. In an automatic train stop device for use with an air brake system having a brake pipe through which air may flow to and from suitable air operated brake mechanism; a normally open valve adapted to interrupt the flow of air through said brake pipe toward said brake mechanism; a cylinder; a piston movable within said cylinder and operatively associated with said valve to hold the same in its normally open condition; means for subjecting one end of said cylinder to the pressure of the air within said brake pipe; a passage through which air may flow from said brake pipe to the external atmosphere; a normally closed valve for controlling the flow of air through said passage; means operated by air under pressure for operating said second mentioned valve; a normally closed valve for controlling the supply of air to said valve operating means; means including a diaphragm, and a chamber subjected to varying air pressure, for operating said last mentioned valve; a conduit through which air under pressure may be supplied to the other end of said cylinder to thereby hold said first mentioned valve in its normally open condition, to the said chamber to thereby hold said last mentioned valve in its normally closed condition, and to the operating means for said second mentioned valve; a normally closed manually operated valve for controlling the supply of air to the second mentioned end of said cylinder and to said chamber; and means for relieving the pressure of air in the second mentioned end of said cylinder and in said chamber to thereby secure the closing of said first mentioned valve and a flow of air from the brake pipe through the passage aforesaid and to the external atmosphere.

3. In an automatic train stop device for use with an air brake system having a brake pipe through which air may flow to and from suitable air operated brake mechanism; a valve seat past which the air flowing in said brake pipe flows; a puppet valve adapted to seat upon said seat to thereby interrupt the flow of air toward said brake mechanism, and to move away from its seat to permit a flow of air in a reverse direction; a stem extending from said valve; a cylinder; a piston movable within said cylinder and acting upon said valve through said stem; means for supplying air under pressure to said cylinder to thereby normally hold said valve off its seat; a passage through which air may flow from the brake pipe to the external atmosphere; a normally closed valve for controlling the flow of air through said passage; and means for simultaneously relieving the pressure in said cylinder to thereby permit said first mentioned valve to move on to its seat, and for operating said second mentioned valve to open the same and permit a flow of air from the brake pipe through the passage aforesaid.

4. In an automatic train stop device for use with an air brake system having a brake pipe through which air may flow to and from suitable air operated brake mechanism; a normally open valve adapted to interrupt the flow of air toward the brake mechanism, and to permit a free flow of air through the brake pipe in a reverse direction; a cylinder; a piston movable within said cylinder and acting upon said valve to normally hold the same in its open condition; means for supplying air under pressure to said cylinder to thereby hold said valve in its normally open condition; a passage through which air may flow from the brake pipe to the external atmosphere; a normally closed valve for controlling the flow of air through said passage; means operated by air under pressure for operating said last mentioned valve; and means for simultaneously relieving the pressure in said cylinder to thereby permit said first mentioned valve to close, and for admitting air under pressure to the operating means for said second mentioned valve to open the same and permit a flow of air from the brake pipe through the passage aforesaid.

5. In an automatic train stop device for use with an air brake system having a brake pipe through which air may flow to and from suitable air operated brake mechanism; a normally open valve adapted to interrupt the flow of air toward the brake mechanism, and to permit a free flow of air through the brake pipe in a reverse direction; means operated by air under pressure for holding said valve in its normally open condition; means for supplying air under pressure to said holding means; a passage through which air may flow from the brake pipe to the external atmosphere; a normally closed valve for controlling the flow of air through said passage; means operated by air under pressure for operating said last mentioned valve; and means for simultaneously relieving the pressure to which said holding means is subjected to thereby permit said first mentioned valve to close, and for admitting air under pressure to the operating means for said second mentioned valve to open the same and permit a flow of air from the brake pipe through the passage aforesaid.

6. In an automatic train stop device for use with an air brake system having a brake pipe through which air may flow to and from suitable air operated brake mechanism; a normally open valve adapted to interrupt the flow of air toward the brake mechanism, and to permit a free flow of air through the brake pipe in a reverse direction; means operated by air under pressure for holding said valve in its normally open condition; a conduit leading to and through which air under pressure may be supplied to said holding means; a normally closed manually operated valve for controlling the flow of air through said conduit; a passage through which air may flow from the brake pipe to the external atmosphere; a normally closed valve for controlling the flow of air through said passage; means operated by air under pressure for operating said last mentioned valve; and means for simultaneously relieving the pressure to which said holding means is subjected to thereby permit said first mentioned valve to close, and for admitting air under pressure to the operating means for said second mentioned valve to open the same and permit a flow of air from the brake pipe through the passage aforesaid.

7. In an automatic train stop device for use with an air brake system having a brake pipe through which air may flow to and from suitable air operated brake mechanism; a valve seat past which the air flowing in said brake pipe flows; a puppet valve adapted to seat upon said seat to thereby interrupt the flow of air toward said brake mechanism, and to move away from its seat to permit a flow of air in a reverse direction; a stem extending from said valve; a cylinder; a piston movable within said cylinder and acting upon said valve through said stem; means for subjecting one end of said piston to the pressure of the air in the brake pipe; means for supplying air under pressure to the other end of said cylinder to thereby normally hold said valve off its seat; a passage through which air may flow from the brake pipe to the external atmosphere; a normally closed valve for controlling the flow of air through said passage; and means for simultaneously relieving the pressure in said cylinder whereby said first mentioned valve is held off its seat to thereby permit said valve to close, and for operating said second mentioned valve to open the same and permit a flow of air from the brake pipe through the passage aforesaid.

8. In an automatic train stop device for use with an air brake system having a brake pipe through which air may flow to and from suitable air operated brake mechanism; a valve seat past which the air flowing in said brake pipe flows; a puppet valve adapted to seat upon said seat to thereby interrupt the flow of air toward said brake mechanism, and to move away from its seat to permit a flow of air in a reverse direction; a stem extending from said valve; a cylinder; a piston movable within said cylinder and acting upon said valve through said stem; means for subjecting one end of said piston to the pressure of the air in the brake pipe; a conduit leading to and through which air under pressure may be supplied to the other end of said cylinder to thereby normally hold said valve off its seat; a normally closed manually operated valve for controlling the flow of air through said conduit; a passage through which air may flow from the brake pipe to the external atmosphere; a normally closed valve for controlling the flow of air through said passage; and means for simultaneously relieving the pressure in said cylinder whereby said first mentioned valve is held off its seat to thereby permit said valve to close, and for operating said second mentioned valve to open the same and permit a flow of air from the brake pipe through the passage aforesaid.

9. In an automatic train stop device for use with an air brake system having a brake pipe through which air may flow to and from suitable air operated brake mechanism; a normally open valve adapted to interrupt the flow of air through said brake pipe toward said brake mechanism; a cylinder; a piston movable within said cylinder and operatively associated with said valve to hold it in its normally open condition; a conduit leading into said cylinder and through which air under pressure may be supplied thereto to thereby hold said valve in its normally open condition; a normally closed manually operable valve for controlling the flow of air through said conduit; and means for relieving said piston from the action of air under pressure to thereby permit said valve to close.

10. In an automatic train stop device for use with an air brake system having a brake pipe through which air may flow to and from suitable air operated brake mechanism; a normally open valve adapted to interrupt the flow of air through said brake pipe toward said brake mechanism; a cylinder; a piston movable within said cylinder and operatively associated with said valve to hold it in its normally open condition; a conduit leading into said cylinder and through which air under pressure may be supplied thereto to thereby hold said valve in its normally open condition; a normally closed manually operable valve for controlling the flow of air through said conduit; a passage through which air may flow from the brake pipe to the external atmosphere; a normally closed valve for controlling the flow of air through said passage; means operated by air under pressure for operating said valve; a normally closed valve for controlling the flow of air to said valve operating means; means whereby said last mentioned valve is held in its closed condition by air under pressure supplied through the conduit aforesaid; and means for relieving the air pressure in said conduit to thereby permit said first mentioned valve to close and said last mentioned valve to open, whereby air may flow to the means aforesaid whereby the valve which controls the passage through which air flows from the brake pipe to the external atmosphere is operated, to thereby operate the said means and open said valve.

11. In an automatic train stop device for use with an air brake system having a brake pipe through which air may flow to and from suitable air operated brake mechanism; a normally open valve adapted to interrupt the flow of air toward the brake mechanism; a cylinder; a piston movable within said cylinder and acting upon said valve to normally hold the same in its open condition; means for supplying air under pressure to said cylinder to thereby hold said valve in its normally open condition; a passage through which air may flow from the brake pipe to the external atmosphere; a normally closed valve for controlling the flow of air through said passage; means operated by air under pressure for operating said last mentioned valve; and means for simultaneously relieving the pressure in said cylinder to thereby permit said first mentioned valve to close, and for admitting air under pressure to the operating means for said second mentioned valve to open the same and permit a flow of air from the brake pipe through the passage aforesaid—the operating means for said second mentioned valve including a piston operatively connected therewith; a cylinder in which said piston operates; and a normally closed air operated valve for controlling the flow of air under pressure into said cylinder.

12. In an automatic train stop device for use with an air brake system having a brake pipe through which air may flow to and from suitable air operated brake mechanism; a normally open valve adapted to interrupt the flow of air toward the brake mechanism, a cylinder; a piston movable within said cylinder and acting upon said valve to normally hold the same in its open condition; means for supplying air under pressure to said cylinder to thereby hold said valve in its normally open condition; a passage through which air may flow from the brake pipe to the external atmosphere; a normally closed valve for controlling the flow of air through said passage; means operated by air under pressure for operating said last mentioned valve; and means for simultaneously relieving the pressure in said cylinder to thereby permit said first mentioned valve to close, and for admitting air under pressure to the operating means for said second mentioned valve to open the same and permit a flow of air from the brake pipe through the passage aforesaid—the operating means for said second mentioned valve including a piston operatively connected therewith; a cylinder in which said piston operates; a normally closed valve for controlling the flow of air under pressure into said cylinder; an operating member operatively connected with said valve; means for subjecting one side of said member to a constant air pressure; and means for subjecting the other side of said member to a variable air pressure.

In witness whereof I have hereunto set my hand at Oroville, county of Butte and State of California, this 17th day of January, 1916.

HOWARD S. FOLKER.

In presence of—
HARRY L. RODERICK.
JAMES HAVEY.